US012020260B2

(12) United States Patent
Bhattacharjee et al.

(10) Patent No.: US 12,020,260 B2
(45) Date of Patent: *Jun. 25, 2024

(54) SYSTEMS AND METHODS FOR GENERATING CUSTOMER SATISFACTION SCORE

(71) Applicant: Mastercard International Incorporated, Purchase, NY (US)

(72) Inventors: Manash Bhattacharjee, Jersey City, NY (US); Prashanna S. Tiwaree, New York, NY (US); Rohit Chauhan, Somers, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,495

(22) Filed: Jan. 20, 2023

(65) Prior Publication Data

US 2023/0162201 A1 May 25, 2023

Related U.S. Application Data

(63) Continuation of application No. 15/385,277, filed on Dec. 20, 2016, now Pat. No. 11,562,370.

(51) Int. Cl.
*G06Q 30/00* (2023.01)
*G06Q 30/016* (2023.01)

(52) U.S. Cl.
CPC .................................. *G06Q 30/016* (2013.01)

(58) Field of Classification Search
CPC .................................................... G06Q 30/016
See application file for complete search history.

(56) References Cited

U.S. PATENT DOCUMENTS 7,617,136 B1 * 11/2009 Lessing ................ G06Q 20/203 705/28
8,577,736 B2 * 11/2013 Swinson ................ G06Q 30/02 705/26.1

(Continued)

FOREIGN PATENT DOCUMENTS

CN 101923669 A * 12/2010
CN 101986342 A * 3/2011

(Continued)

OTHER PUBLICATIONS

S.C. Hui, "Data Mining for Customer Service Support", 2000, Information & Management 38 (2000), pp. 1-13. (Year: 2000).*

(Continued)

*Primary Examiner* — Tan D Nguyen
(74) *Attorney, Agent, or Firm* — Armstrong Teasdale LLP

(57) ABSTRACT

A gratuity analytics computing system, for generating gratuity analytics for a plurality of transactions of a customer at a service provider within a date range, is in communication with an electronic device of the service provider over an electronic network. The system includes a gratuity analytics computing device, a database including a memory in operable electronic communication with the gratuity analytics computing device, and a processor configured to: receive transaction data for the plurality of customer transactions occurring within the date range, match a plurality of authorization messages with a respective plurality of clearing messages, generate gratuity analytics for the plurality of customer transactions over the date range based on average tip data from the customer, and calculate a customer satisfaction score for one customer transaction of the plurality of customer transactions based on the generated gratuity analytics.

20 Claims, 9 Drawing Sheets

(56) References Cited

U.S. PATENT DOCUMENTS

| | | | | |
|---|---|---|---|---|
| 10,430,900 | B2 | 10/2019 | Bhattacharjee et al. | |
| 2006/0085267 | A1 | 4/2006 | Lovegreen et al. | |
| 2010/0257013 | A1 | 10/2010 | Beauregard | |
| 2013/0246216 | A1 | 9/2013 | Chau et al. | |
| 2014/0067726 | A1 | 3/2014 | Greene et al. | |
| 2014/0372284 | A1* | 12/2014 | Stekkelpak | G06Q 40/00 705/39 |
| 2015/0193745 | A1 | 7/2015 | Handwerger et al. | |
| 2015/0310403 | A1 | 10/2015 | Chen et al. | |
| 2016/0055493 | A1 | 2/2016 | Chau et al. | |
| 2016/0055508 | A1 | 2/2016 | Chau et al. | |
| 2016/0055600 | A1 | 2/2016 | Chau et al. | |
| 2016/0071122 | A1 | 3/2016 | Chau et al. | |
| 2016/0170998 | A1* | 6/2016 | Frank | G06F 16/908 707/748 |
| 2016/0350769 | A1* | 12/2016 | Venkatesh | G06Q 20/023 |
| 2016/0379202 | A1 | 12/2016 | Turner | |
| 2017/0053486 | A1* | 2/2017 | Takeda | G07F 17/3234 |

FOREIGN PATENT DOCUMENTS

| | | | | |
|---|---|---|---|---|
| CN | 106157119 | A | 11/2016 | |
| DE | 102015113924 | A1 * | 2/2016 | G06F 11/3006 |
| JP | 2000226138 | A | 8/2000 | |
| WO | 2006007452 | A1 | 1/2006 | |
| WO | 2006010129 | A2 | 1/2006 | |
| WO | WO-2011062008 | A1 * | 5/2011 | A63F 13/12 |

OTHER PUBLICATIONS

Jonathan Herzig, "Predicting customer satisfaction . . . using Affective Features," 2016, ACM, pp. 115-119. (Year: 2016).*

Kailun Hu, "Utilizing User's Tipping Points in E-Commerce Recommender Systems," 2013, IEEE, pp. 494-504 (Year: 2013).*

Mollie M. Swann, "Tip Reporting In Independent Food and Beverage Establishment" 2013, Journal of Hospitality Financial Management, vol. 20, Issue 2, pp. 1-22. (Year: 2013).*

A. Nicolaides, "Service Quality provision in upmarket restaurants: a survey of diners in three restaurants in a Gauteng Casino complex," 2012, African Journal of Hospitality, Tourism and Leisure, vol. 2 (2)-(2012), pp. 1-21, ISSN: 2223-814X. (Year: 2012).*

Murat Yesiltas, "The Effects of Service Quality on Customer's Tipping Behavior," 2014, International Journal of Academic Research in Business and Social Sciences, Aug. 2014, pp. 430-446. (Year: 2014).*

The Internet of Things You Don't Own, MIT Press, 2016, Jan. 1, 2016, 1 page.

Forrest V. Morgeson III, "An Investigation of the Cross-national Determinants of Customer Satisfaction", Journal of the Acad. Mark Science, Nov. 10, 2010, 39: pp. 198-215.

S.C. Hui et al., "Data Mining for Customer Service Support", Information & Management, 38, 2000, pp. 1-13.

A. Nicolaides, "Service Quality Provision in Upmarket Restaurants: A Survey of Diners in Three Restaurants in a Gauteng Casino Complex", African Journal of Hospitality, Tourism and Leisure, vol. 2(2), 2012, pp. 1-21, ISSN: 2223-814X.

* cited by examiner

| | Absolute Scale (%) | | | | Normalized Scale | | |
|---|---|---|---|---|---|---|---|
| | Merch A | Merch B | Merch C | Average Tip % by person | Merch A | Merch B | Merch C |
| Sam | 10 | 11 | 12 | 11.00000000 | 0.90909091 | 1.0 | 1.090909 |
| Watson | 20 | 18 | 18 | 18.66666667 | 1.07142857 | 0.964286 | 0.964286 |
| Jack | 25 | 15 | 24 | 21.33333333 | 1.17187500 | 0.703125 | 1.125000 |
| **AVG.** | **18.33333** | **14.66667** | **18** | | **1.05079816** | **0.889137** | **1.060065** |

902 904 906 908 910 912 914

SYSTEMS AND METHODS FOR GENERATING CUSTOMER SATISFACTION SCORE

CROSS REFERENCE TO RELATED APPLICATIONS

This application is a continuation application of U.S. patent application Ser. No. 15/385,277, filed Dec. 20, 2016, entitled "SYSTEMS AND METHODS FOR GENERATING CUSTOMER SATISFACTION SCORE", the disclosure of which is incorporated herein by reference in its entirety.

BACKGROUND

The present application relates generally to a technology that may be used to assist in predicting merchant performance, and more particularly, to network-based systems and methods for analyzing and comparing businesses based on gratuity information associated with those businesses.

A gratuity, also referred to as a tip, is an amount of money tendered by a customer to a person associated with a merchant (e.g., an employee) as a way of thanking the person for a service performed. The tip is an amount of money typically paid by the customer in addition to the base price of the service or the goods purchased by the customer. Tipping is a widely practiced social custom in the United States and is usually voluntary. For example, tips are generally given for services at restaurants, golf courses, hotels, spas and salons, casinos, barber shops, as well as to taxi drivers, movers, and the like. Higher tips may be given for excellent service while smaller tips or no tips may be given for poor service. In the United States, certain types of employees, such as waiters and waitresses in a restaurant, may rely mostly on tips for income because their employers are allowed to pay them less than minimum wage with the expectation that the employee's income will be supplemented by tips.

Analysis of average tipping amounts in a particular area may provide insight into the financial condition of a community (e.g., flourishing or dwindling) and/or the performance of a specific business (e.g., merchant, restaurant, group or chain of restaurants, delivery services, etc.). Average or aggregate tipping information provides objective benchmark information, but does not provide insight into the actual satisfaction level of a particular customer. For example, a customer may give an 18% gratuity for a particular service, such as a haircut, which may be considered "above standard" in an industry where a 15% gratuity is considered "standard." The 18% gratuity though, does not provide a strong indicator of whether the particular customer was satisfied with the service. Specifically, 18% may be considered above standard for the industry, but it may be well below that particular customer's historical tipping level, which could be 20% or above at that particular business or similar businesses in the geographic area. That is, in this example, an objectively higher gratuity may nevertheless represent customer dissatisfaction from a "big tipper." Similarly, a below-standard gratuity may nevertheless represent a high level of customer satisfaction from a customer who does not historically tip a lot.

BRIEF DESCRIPTION

In an aspect, a gratuity analytics computing system is presented. The gratuity analytics system is configured to generate gratuity analytics for a plurality of transactions of a customer at a service provider within a date range. The system is in communication with an electronic device of the service provider over an electronic network, and includes a gratuity analytics computing device, a database including a memory in operable electronic communication with the gratuity analytics computing device, and a processor configured to: receive transaction data for the plurality of customer transactions occurring within the date range, match a plurality of authorization messages with a respective plurality of clearing messages, generate gratuity analytics for the plurality of customer transactions over the date range based on average tip data from the customer, and calculate a customer satisfaction score for one customer transaction of the plurality of customer transactions based on the generated gratuity analytics.

In another aspect, a method for generating gratuity analytics for one or more service providers is implemented by a gratuity analytics computing device including at least one processor and a memory. The gratuity analytics computing device is in communication with a client computing device. The method includes the steps of receiving transaction data for the plurality of customer transactions occurring within a date range, matching a plurality of authorization messages with a respective plurality of clearing messages, generating gratuity analytics for the plurality of customer transactions over the date range based on average tip data from the customer, and calculating a customer satisfaction score for one customer transaction of the plurality of customer transactions based on the generated gratuity analytics.

In a further aspect, a computer-readable storage medium having computer-executable instructions embodied thereon, which when executed by processor of a gratuity analytics computing device including at least one memory, the computer-readable instructions cause the processor to receive transaction data for the plurality of customer transactions occurring within a date range, match a plurality of authorization messages with a respective plurality of clearing messages, generate gratuity analytics for the plurality of customer transactions over the date range based on average tip data from the customer, and calculate a customer satisfaction score for one customer transaction of the plurality of customer transactions based on the generated gratuity analytics.

BRIEF DESCRIPTION OF THE DRAWINGS

FIGS. 1-9 show example embodiments of the methods and systems described herein.

FIG. 1 is a schematic diagram illustrating an example multi-party payment processing system for enabling payment-by-card transactions and generating aggregated merchant analytics in accordance with one embodiment of the present disclosure.

FIG. 2 is an expanded block diagram of an example embodiment of a computer system used in processing payment transactions that includes a gratuity analytics computing device in accordance with one example embodiment of the present disclosure.

FIG. 3 illustrates an example configuration of a server system such as the gratuity analytics computing device of FIG. 2.

FIG. 4 illustrates an example configuration of a client system shown in FIG. 2.

FIG. 5 is a simplified data flow diagram for generating gratuity analytics using the gratuity analytics computing device of FIG. 2.

FIG. 6 is a data flow block diagram illustrating an example process of calculating and analyzing gratuity data in accordance with an example embodiment of the present disclosure.

FIG. 7 is a simplified diagram of an example method for generating merchant analytics and displaying the analytics on a user interface using the merchant analytics computing device of FIG. 2.

FIG. 8 is a diagram of components of one or more example computing devices that may be used in the environment shown in FIG. 2.

FIG. 9 illustrates an exemplary gratuity analytics table that may be generated by a gratuity analytics computing device, and displayed to a user in whole or in part, according to the embodiments described herein.

Figure 1:
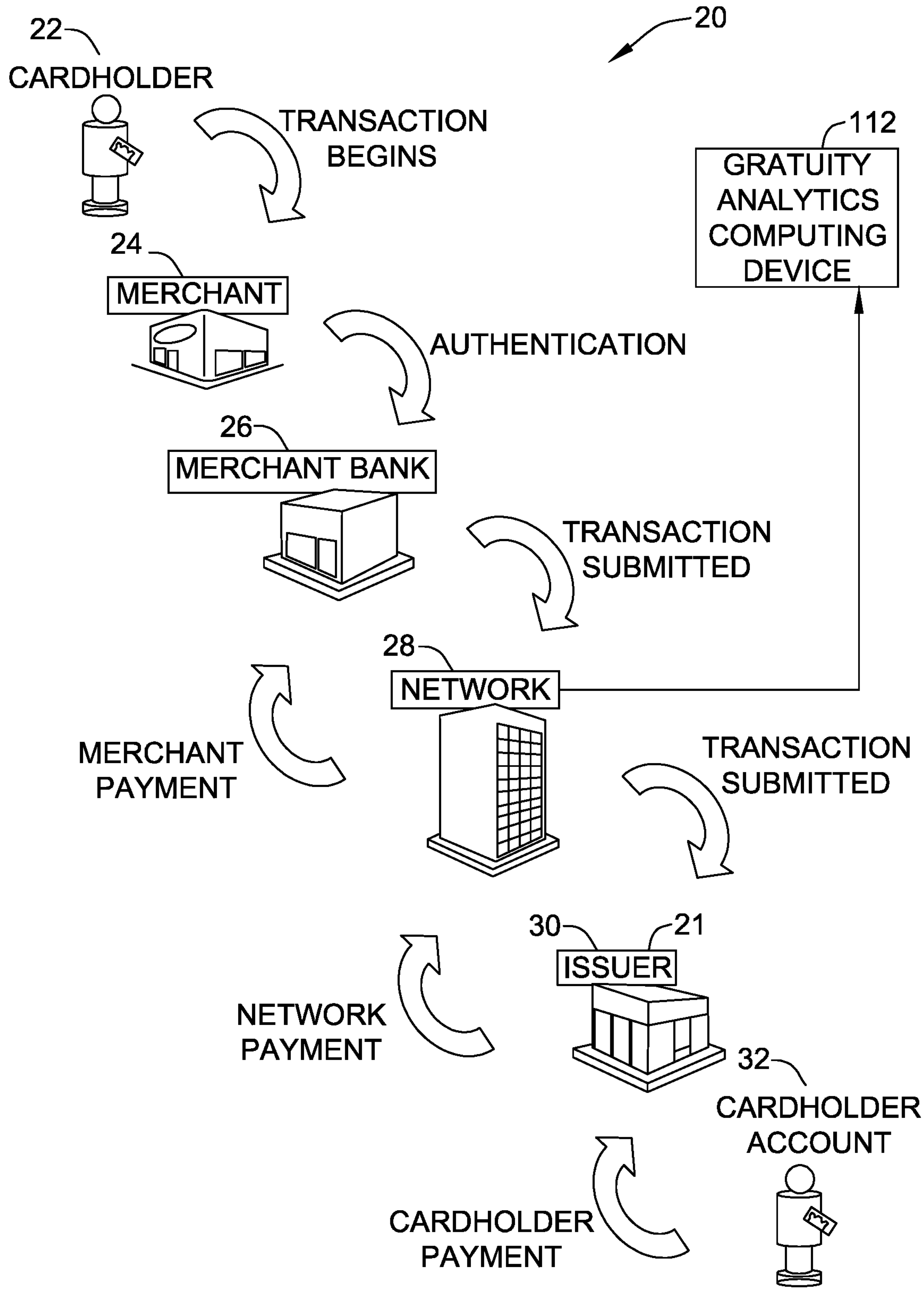

Although specific features of various embodiments may be shown in some drawings and not in others, this is for convenience only. Any feature of any drawing may be referenced and/or claimed in combination with any feature of any other drawing.

DETAILED DESCRIPTION

The systems and methods described herein are directed to generating gratuity analytics for one or more restaurants. In one embodiment, the system is associated with or integral to a payment processing network including a payment processor configured to process transactions initiated by cardholders using payment cards (e.g., credit cards, debit card, prepaid cards, computing devices for storing payment account information, etc.). The payment processor collects transaction data associated with these transactions for further processing. In the example embodiment, the system includes a gratuity analytics computing device configured to process the transaction data to calculate tip data using transaction data from the payment processor, and to generate gratuity analytics based on the tip data.

As used herein, "restaurant" refers generally to any merchant serving food and/or beverages, such as fast food restaurants, "sit-down" restaurants, bars, eating establishments within other merchant locations (e.g., a café within a bookstore), etc. Although the term restaurant is used within this application, there may be other uses for this application where restaurant could be any industry where tips are received (e.g., spa, tour guide, taxi service, maid service, home improvement, delivery services). It should also be noted that a delivery service for a particular restaurant will not typically experience as high a tip percentage from a customer, as the restaurant would expect from the same customer sitting down to dine in the restaurant, which can be a factor in the calculations described below. That is, dine-in customers generally tip higher than delivery customers. In at least some cases, a tip size for a particular business may serve as a proxy for quality of service and/or for financial success (or lack thereof). According to the embodiments described herein though, where the tips are normalized over time, as opposed to merely averaging or aggregating, a more accurate customer satisfaction/happiness score may be obtained for a particular business within a particular industry.

In the example embodiment described herein, the gratuity analytics computing device calculates a tip amount for each transaction initiated at the business using authorization data and clearing data. In order to pay for a bill at a restaurant, for example, a customer may provide their account information, which may include a payment card account associated with a payment card such as a credit card or a debit card. An employee, in this example, a waiter or waitress, may input the customer's account information by swiping (or otherwise communicating) a payment card through a point-of-sale (POS) device. The input account information may be transmitted to, for example, a payment processor, an issuing bank, and the like, to authorize payment of the bill for the meal.

This initial input includes authorization data of a purchase of a meal, and typically includes the base price of the meal. Upon successful authorization of the base price by the issuing bank, a receipt may be printed out or some other form of confirmation may be generated. In this example, the customer may add a gratuity to the base price by inserting the gratuity into the receipt or confirmation. That is, after the initial authorization for the base price of the meal, the customer has the opportunity to add a gratuity. When the customer adds a gratuity and adds their signature to or otherwise authorizes the final bill, the employee will typically enter the total payment amount or the total amount may be automatically entered. Here, the total amount includes the tip plus the base price. In this example, the total amount may also be sent to the payment processor as a final amount. For example, a clearing message or clearing data including the final total may be transmitted to the payment processor.

In some embodiments, the gratuity analytics computing device is in real-time communication with the POS device. For example, the gratuity analytics computing device receives a real-time data feed from the POS device. POS integration allows real time triggers and alerts to the business management about customer satisfaction/happiness (while the customer is still on the premises) and/or server performance. For example, the gratuity analytics computing device calculates tip percentages based on the real-time POS data feed and sends an alert to a manager device if the tip percentage for a transaction or a group transaction (e.g., entered by a specific employee) is below a predetermined threshold.

In other embodiments, the gratuity analytics computing device is not necessarily in real-time communication with a POS device. The gratuity analytics computing device may be in communication with the payment processor and receive historical transaction data. A non-POS option will still allow the application to compare manager performance by combining manager data from business systems with transaction data. For example, the non-POS option may use the historical transaction data to calculate tip percentages for a plurality of employees and individual business or franchise (e.g., a server in a restaurant), or a plurality of franchises for a chain of businesses (e.g., compare one franchise to another within the same chain, or industry, based on customer satisfaction information). This calculation may use historical data within a specified time range (e.g., tip amounts may be higher at 8 PM—dinner hour—than at LOAM), within a particular industry (e.g., fast food restaurants, taxi services), and/or within a particular geographic region.

The gratuity analytics computing device may receive both authorization data and clearing data from the payment processor. In the restaurant example, the gratuity analytics computing device may determine that the authorization data for the base price of the meal and the clearing data for the total amount of the meal (i.e., base price plus tip) correspond to the same transaction. For example, the gratuity analytics computing device may perform a clearing/authorization matching process that links together authorization messages with respective clearing messages based on one or more transaction identifiers included in the authorizations (e.g., messages) and the clearings (e.g., messages). Accordingly, the gratuity analytics computing device may determine that authorization data matches or corresponds to clearing data, and further compare an authorization transaction amount included in the authorization data with a clearing transaction amount included in the clearing data to determine a tip amount.

In the example embodiment, at least a portion of the transaction and gratuity data is extracted from authorization and/or clearing messages from the payment network, such as ISO® 8583 compliant messages and ISO® 20022 compliant messages. As used herein, "ISO®" refers to a series of standards approved by the International Organization for Standardization (ISO is a registered trademark of the International Organization for Standardization of Geneva, Switzerland). ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations for data elements. ISO® 20022 compliant messages are defined by the ISO® 20022 standard. For example, ISO® 20022 compliant messages may include acceptor to issuer card messages (ATICA).

In an exemplary embodiment, the gratuity analytics computing device performs a calculation of tip amounts based on historical transaction data. The gratuity analytics computing device receives a date range from a client computing device. The client computing device may be any electronic computing device capable of communicating over a communication link (e.g., the Internet, LAN, WAN, or other electronic communications network) with the gratuity analytics computing device, which may include, for example and without limitation, a personal computer, a server computer, a smartphone, and/or a tablet. The date range is input to the client computing device by a user (e.g., a user associated with a particular franchise of a chain of such businesses) to view gratuity analytics associated with that date range. The date range may be as small as a month and may be as large as a number of years. In some embodiments, the scale of the date range affects the scale of the determined gratuity analytics. For example, if a date range of a number of years is received, the gratuity analytics computing device may generate gratuity analytics on a month-by-month scale. If a date range of a number of months (e.g., less than a year) is received, the gratuity analytics computing device may generate gratuity analytics on a month-by-month and/or a week-by-week scale.

The gratuity analytics computing device receives or retrieves transaction data for the received date range. The transaction data is received or retrieved from, for example, a payment processor and/or associated database configured to store transaction data. The transaction data is associated with a plurality of financial transactions initiated within the received date range. The transactions may be further associated (e.g., stored and linked within database) with one particular business and/or with a particular chain of such businesses, which may be identified by the user of the client computing device. Similarly, the transactions may alternatively be associated with a particular independent contractor (e.g., a subscriber taxi driver) and/or with a particular type of business (e.g., online taxi service) which utilizes such independent contractors. The gratuity analytics computing device may further retrieve transaction data that is associated with one or more competitor businesses, as described further herein.

According to an exemplary embodiment, the transaction data may further include data elements such as a manager identifier, time stamp, and employee/contractor identifier associated with each of the financial transactions. The transaction data may further include the authorization transactions and clearing transactions, described above. The gratuity analytics computing device performs the above-described matching process to determine a tip amount for each matched transaction, wherein each matched transaction represents one meal (restaurant example), one ride (taxi service example), or bill paid.

In various embodiments, the gratuity analytics computing device is configured to determine relative tip sizes according to a plurality of metrics, including time intervals (e.g., days of the week or particular time intervals within a day), merchant identifier, manager identifier, and/or employee/contractor identifier. In other words, the gratuity analytics computing device may be further configured to divide the received transaction data into a plurality of subsets according to at least one of the above-identified metrics and generate gratuity analytics such as tip size for each of the subsets for comparison. The gratuity analytics computing device may generate gratuity analytics for a plurality of time intervals such that those time intervals may be compared to one another, for example, to determine a most and/or least successful time interval, or to determine a trend over a plurality of adjacent or subsequent time intervals, etc. In an exemplary embodiment, the gratuity analytics computing device generates gratuity analytics for a particular customer's purchasing history and normalizes the customer's historical gratuity analytics to calculate a customer satisfaction score.

The gratuity analytics computing device may use the manager or employee/contractor identifier for each matched transaction to divide the transaction data according to a particular manager or service provider. The gratuity analytics computing device may then generate gratuity analytics for each individual employee, contractor, and/or manager at a particular business for comparison to one another, either within a particular time interval (e.g., which employee/contractor or manager was more successful within a particular day or weekend) and/or overall (e.g., how one particular business compares with similar businesses in the same geographic region, or other franchises of the same chain).

The gratuity analytics computing device may further generate benchmark gratuity analytics such as average tip size for a plurality of individual restaurants within a chain, or "inter-location" gratuity analytics, for comparison of restaurant locations within the chain, which may be useful to a company to determine, by objective data, the best and worst performing restaurant locations within a chain. In an exemplary embodiment, the gratuity analytics computing device generates customer historical gratuity analytics, normalizes generated customer historical data, and calculates a customer satisfaction score for one or more purchases by the customer where a gratuity is (or in some cases, is not) provided. The customer satisfaction score may be provided as a standalone piece of information, or may be compared with the benchmark gratuity analytics, such as the average and/or aggregate tip size.

The gratuity analytics computing device may further generate gratuity analytics for one or more competitor businesses and/or business chains/franchises. The gratuity analytics computing device may identify one or more competitors and retrieve transaction data therefor to generate benchmark average tip size analytics, as described above.

The gratuity analytics computing device may identify the competitor(s) by, for example, referencing a list or table. The list or table may be generated (by the gratuity analytics computing device and/or by another, separate computing device) by optionally determining an average ticket size (e.g., average bill amount) and/or sales volume for the merchant or business, and/or for a plurality of potential competitor businesses; normalizing historical customer gratuity analytics for the business and one or more of the competing businesses; calculating a customer satisfaction score for each of the normalized historical customer gratuity analytics; and identifying one or more of the competitor businesses that have a comparable or better customer satisfaction score. In an exemplary embodiment, the identified customer satisfaction score(s) may be considered against average ticket size and/or sales volume from competing businesses to analyze how customer satisfaction score may vary with respect to business size and/or volume, in addition to other factors such as location, schedule, etc. In some embodiments, the names of the competitor businesses are not provided to the requesting party, but rather, the identifying data is anonymized so that the requesting party is able to compare its gratuity analytics to a competitor's analytics without knowing exactly who the competitor is.

In some embodiments, the gratuity analytics computing device is further configured to generate card analytics associated with the business. In these embodiments, the transaction data includes a card type of each payment card used to initiate a respective one of the financial transactions represented by the transaction data. "Card type" may include an issuer identifier (e.g., Citibank), a loyalty identifier (e.g., a particular points or rewards program), and/or a level identifier (e.g., basic, corporate, business, premium, gold/silver, etc.). The gratuity analytics computing device may identify at least one commonly used card type. A commonly used card type may be defined as, for example, one or more card types with the highest usage frequency and/or one or more card types that exceed a particular usage frequency (e.g., 100 uses or 1% of the total uses). The gratuity analytics computing device may then identify the associated issuer loyalty program etc. to the restaurant, such that the restaurant may approach the corresponding issuer loyalty program etc. with one or more offers to present to cardholders having a payment card of that corresponding card type.

In another embodiment, the gratuity analytics computing device performs real-time calculation of tip amounts. In this embodiment, which is not exclusive of the above-described first embodiment, the gratuity analytics computing device receives a real-time POS data feed. This POS data feed comes from a merchant POS, for example, located within the actual business. When an employee swipes a consumer's card or otherwise authorizes a transaction for a bill to be paid for, an authorization transaction (described above) is generated. The authorization transaction includes data elements such as a first bill amount, an employee identifier, a manager identifier (if applicable), and a location identifier. In many cases, the employee enters a tip amount soon after, generating an associated clearing transaction for the same bill. Because the gratuity analytics computing device is receiving the real-time POS feed, the gratuity analytics computing device receives this clearing transaction, including a second bill amount equal to the first bill amount plus the tip amount, in real-time. Therefore, the gratuity analytics computing device can calculate the tip amount for the bill in real-time.

In an exemplary embodiment, the gratuity analytics computing device compares the calculated tip amount against customer historical gratuity analytics, and normalizes the calculated tip amount against a customer satisfaction score for that particular customer. When the normalized calculated tip amount falls below a normalized scale indicating customer satisfaction (e.g., a value of "1", explained further below), the gratuity analytics computing device is configured to further transmit an alert (e.g., a text, email, and/or app "push" notification) to a device associated with the business or merchant identifier (e.g., a phone of the business employee or a POS device). In one embodiment, the alert may include an employee/contractor identifier associated with the bill (and/or a table identifier in the restaurant example, or an automobile in the taxi service example). In this example, the service provider may be able to take immediate action for a particular low or high customer satisfaction score, while the associated consumer is still likely in the vicinity of the merchant's location (e.g., within the merchant location).

In an alternative embodiment, the gratuity analytics computing device is further configured to optionally compare the calculated tip amount to a benchmark threshold tip range (e.g., 10%-20%), the threshold tip range representing a typical or "acceptable" (i.e., standard) range of tip amounts. This benchmark range may be predefined, for example, by one or more of the particular industry, geographic area, season, or by a target percentage set by the particular business. Such additional objective benchmark information may provide a business a further indication of how gratuity levels in their particular business and/or region compare with objective customer satisfaction scores, and may thus give the business an opportunity to further incentivize gratuities for satisfied customers.

The gratuity analytics computing device is further configured to facilitate the display of an interactive graphical user interface (GUI). The GUI may be displayed on a client computing device of a user. The GUI is configured such that the user may easily view the generated gratuity analytics, for example, on a dashboard accessible through an app and/or a web browser. The GUI enables the user to select the date range and/or business(es) of interest, such that the gratuity analytics computing device may perform the processes described above to generate relevant analytics.

The methods and systems described herein may be implemented using computer programming or engineering techniques including computer software, firmware, hardware or any combination or subset thereof, wherein the technical effects may be achieved by performing one of the following steps: (i) receive transaction data for the plurality of customer transactions occurring within the date range, (ii) match a plurality of authorization messages with a respective plurality of clearing messages, (iii) generate gratuity analytics for the plurality of customer transactions over the date range based on average tip data from the customer, and (iv) calculate a customer satisfaction score for one customer transaction of the plurality of customer transactions based on the generated gratuity analytics.

The systems and methods described herein are configured to facilitate (a) determining gratuity analytics for a service provider, (b) receiving a real-time data feed from a point of sale device that is used for determining gratuity analytics, (c) generating real time triggers and alerts for sending to managers regarding customer satisfaction/happiness (while the customer is still on the premises) and/or server performance, (d) calculating tip percentages based on real-time POS data feed and sending alerts to manager devices if the tip percentage for a transaction or a group transaction (e.g., entered by a specific employee) is below a predetermined threshold, (e) determine gratuity analytics for a service provider and for competitors of the service provider, and present the gratuity analytics to the service provider comparison purposes, and (0 determine trends for gratuity analytics including for a plurality of time intervals such that those time intervals may be compared to one another (e.g., determine a most and/or least successful time interval, or determine a trend over a plurality of adjacent or subsequent time intervals).

The following detailed description of the embodiments of the disclosure refers to the accompanying drawings. The same reference numbers in different drawings may identify the same or similar elements. Also, the following detailed description does not limit the claims.

Described herein are computer systems such as gratuity analytics computing devices. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In an exemplary embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computing devices capable of providing account information. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the generation and communication (e.g., display) of aggregate gratuity analytics.

FIG. 1 is a schematic diagram illustrating an example multi-party payment processing system 20 for enabling payment-by-card transactions and communicating aggregated gratuity analytics for a sector, in accordance with one embodiment of the present disclosure. FIG. 1 depicts a flow of data in a financial transaction through system 20, which includes a gratuity analytics computing device 112. Components of system 20 provide gratuity analytics computing device 112 with transaction data, which gratuity analytics computing device 112 processes to generate gratuity analytics and provide the analytics on a user interface.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, New York).

In the example processing system 20, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a POS terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the POS terminal will be configured to communicate with the third party. Such a third party is usually called a "merchant processor," an "acquiring processor," or a "third party processor."

Using an interchange network (or payment network) 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including gratuity analytics computing device 112. In the example embodiment, interchange network 28 provides such transaction data (including merchant data associated with merchant tenants of each commercial real estate asset of each portfolio record) and additional transaction data. In alternative embodiments, any party may provide such data to gratuity analytics computing device 112.

After a transaction is authorized and cleared, the transaction is settled among merchant 24, merchant bank 26, and issuer bank 30. Settlement refers to the transfer of financial data or funds among account of merchant 24, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, gratuity analytics computing device 112 may be used to generate and communicate aggregated gratuity analytics. Although the systems described herein are not intended to be limited to facilitate such applications, the systems are described as such for exemplary purposes.

Figure 2:
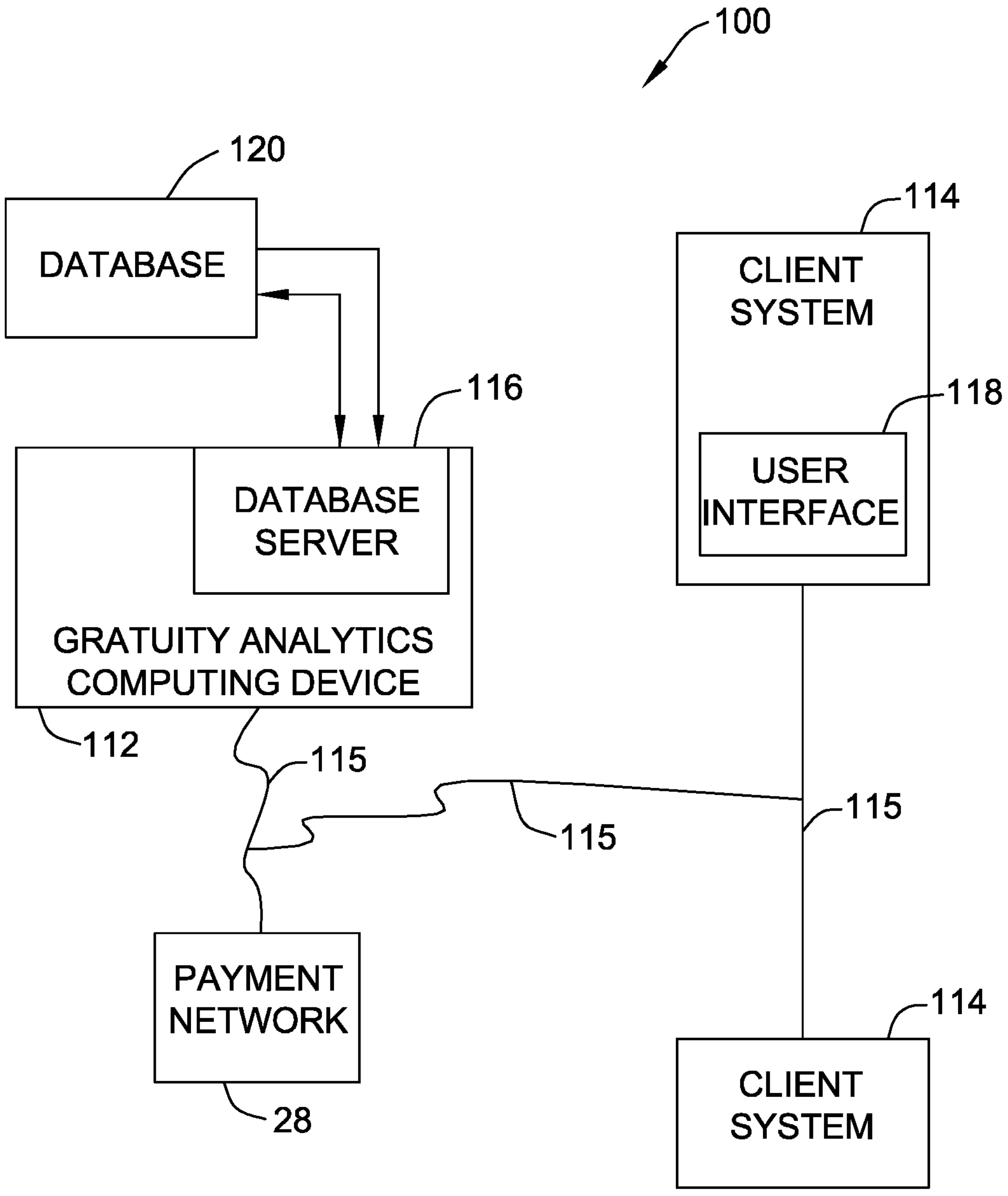

FIG. 2 is an expanded block diagram of an example embodiment of a computer system 100 used in processing payment transactions that includes gratuity analytics computing device 112 in accordance with one example embodiment of the present disclosure. In the example embodiment, system 100 is used for generating gratuity analytics and displaying the analytics on a user interface, as described herein.

More specifically, in the example embodiment, system 100 includes a gratuity analytics computing device 112, and a plurality of client sub-systems, also referred to as client systems 114, connected to gratuity analytics computing device 112. In one embodiment, client systems 114 are computers including a web browser, such that gratuity analytics computing device 112 is accessible to client systems 114 using the Internet and/or using network 115. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with cardholders 22 (shown in FIG. 1) as well as external systems used to store data. Gratuity analytics computing device 112 is also in communication with payment network 28 using network 115. Payment network 28 includes a payment processor. Further, client systems 114 may additionally communicate with payment network 28 using network 115. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on gratuity analytics computing device 112 and can be accessed by potential users at one of client systems 114 by logging onto gratuity analytics computing device 112 through one of client systems 114. In an alternative embodiment, database 120 is stored remotely from gratuity analytics computing device 112 and may be non-centralized. Database 120 may be a database configured to store information used by gratuity analytics computing device 112 including, for example, transaction data, defined sectors, merchant definitions, user data, portfolio records, merchant scores, and sector scores.

Database 120 may include a single database having separated sections or partitions, or may include multiple databases, each being separate from each other. Database 120 may store transaction data generated over the processing network including data relating to merchants, consumers, account holders, prospective customers, issuers, acquirers, and/or purchases made. Database 120 may also store account data including at least one of a cardholder name, a cardholder address, an account number, other account identifiers, and transaction information. Database 120 may also store merchant information including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of client systems 114 may be associated with one of acquirer bank 26 (shown in FIG. 1) and issuer bank 30 (also shown in FIG. 1). For example, one of client systems 114 may be a POS device. Client systems 114 may additionally or alternatively be associated with a user (e.g., a commercial real estate owner or lender, a marketing director, a consumer, or any other end user). In the example embodiment, one of client systems 114 includes a user interface 118. For example, user interface 118 may include a GUI with interactive functionality, such that aggregated benchmark gratuity analytics and customer historic gratuity analytics, transmitted from gratuity analytics computing device 112 to client system 114, may be shown in a graphical format. A user of client system 114 may interact with user interface 118 to view, explore, and otherwise interact with the benchmark and customer historic gratuity analytics. Gratuity analytics computing device 112 may be associated with interchange network 28 and/or may process transaction data.

Figure 3:
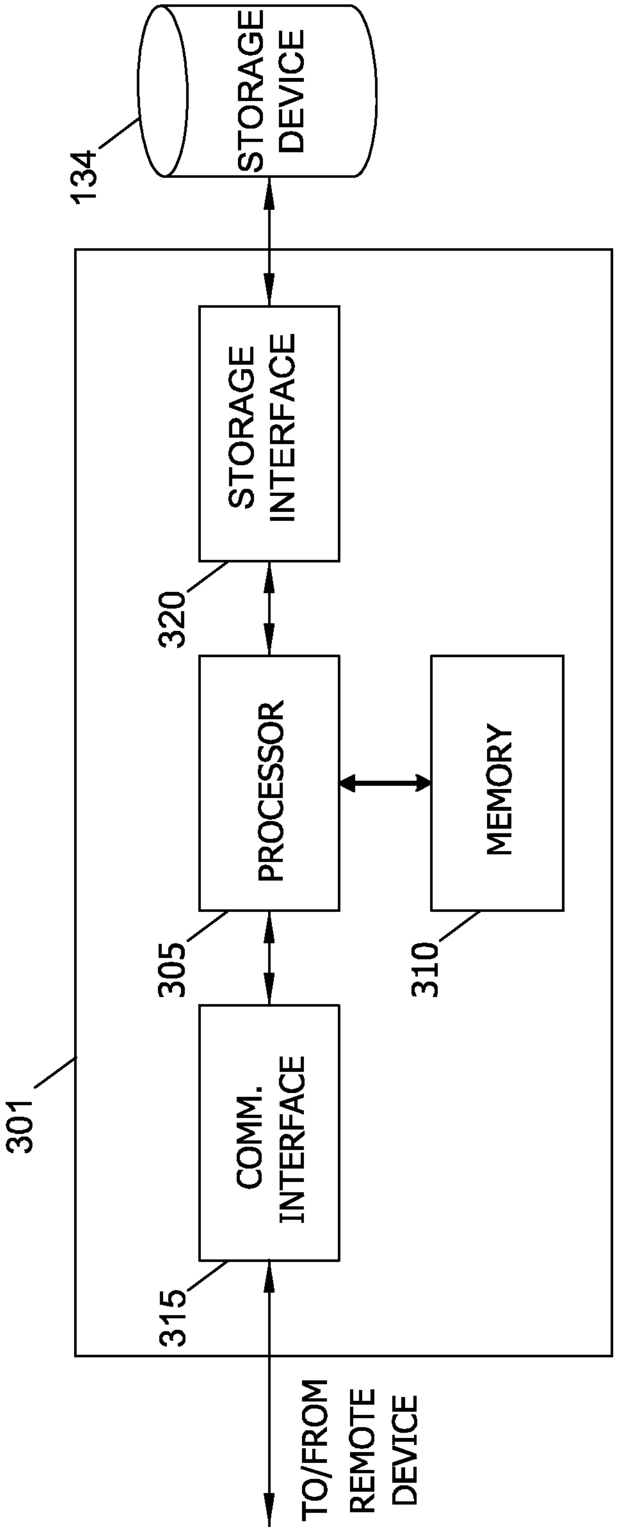

FIG. 3 illustrates an example configuration of a server system 301 such as gratuity analytics computing device 112 (shown in FIGS. 1 and 2) used to generate gratuity analytics and present said analytics on an interactive user interface, in accordance with one example embodiment of the present disclosure. Server system 301 may also include, but is not limited to, database server 116. In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests (e.g., requests to display gratuity analytics and/or provide an interactive user interface) from a client system 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
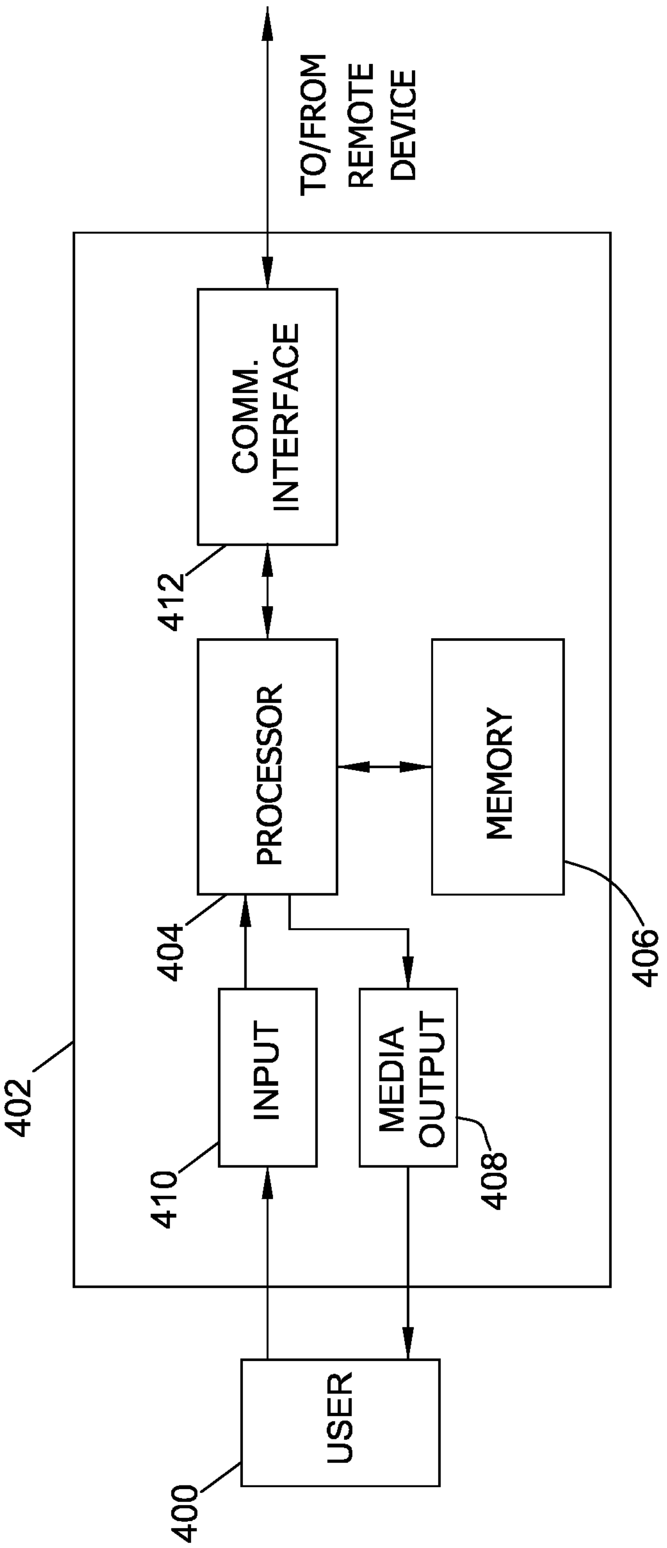

FIG. 4 illustrates an example configuration of a user device 400 in relation to a client computing device 402. Client computing device 402 may include, but is not limited to, client systems ("client computing devices") 114. In an exemplary embodiment, client computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

In an exemplary embodiment, client computing device 402 further includes at least one media output component 408 for presenting information to user device 400. Media output component 408 is any component capable of conveying information to user device 400. In some embodiments, media output component 408 includes an output adapter such as a video adapter and/or an audio adapter. An output adapter is operatively coupled to processor 404 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 410 for receiving input from user device 400. Input device 410 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 410.

Client computing device 402 may also include a communication interface 412, which is configured to communicatively couple with a remote device such as server system 302 or a web server operated by a merchant. Communication interface 412 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 406 are, for example, computer-readable instructions for providing a user interface to user device 400 via media output component 408 and, optionally, receiving and processing input from input device 410. A user interface may include, among other possibilities, a web browser and client application. Web browsers enable user devices 400 to display and interact with media and other information typically embedded on a web page or a website from a web server associated with a merchant. A client application allows user devices 400 to interact with a server application associated with, for example, a merchant. The user interface, via one or both of a web browser and a client application, facilitates display of generated benchmark and customer historic gratuity analytics by gratuity analytics computing device 112. The user may interact with the user interface to view and explore the gratuity analytics, for example, by selecting a sector of interest using input device 410 and viewing analytics, including a customer satisfaction score, associated with that sector.

Figure 5:
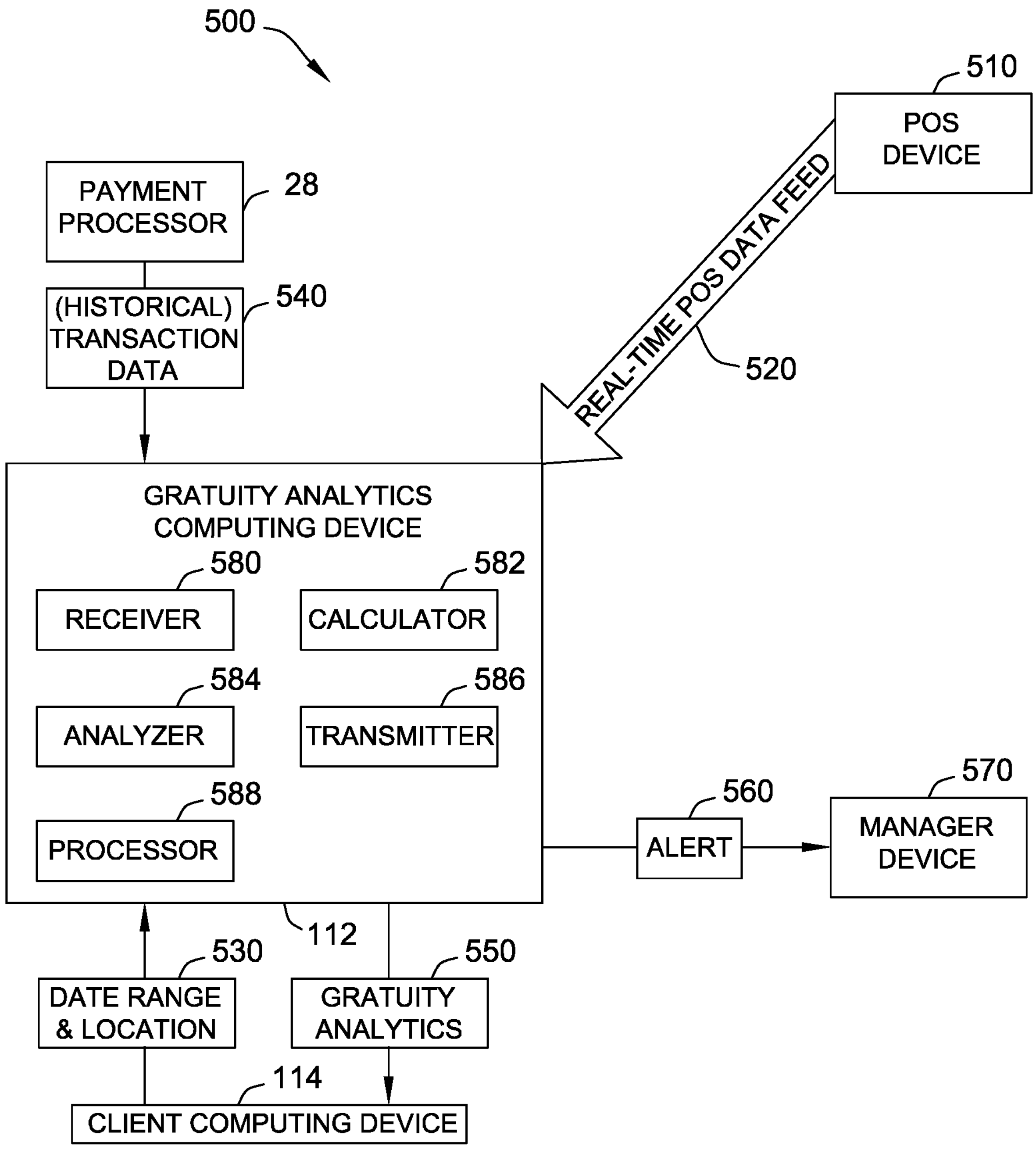

FIG. 5 is a simplified data flow diagram for generating benchmark and customer historic gratuity analytics for merchants, and providing the analytics for display on a user interface using gratuity analytics computing device 112. Such displayed gratuity analytics may include a customer satisfaction score, and optional aggregated gratuity analytics for comparison. In an exemplary embodiment, gratuity analytics computing device 112 includes a receiver 580, a calculator 582, an analyzer 584, a transmitter 586, and a processor 588. Although not illustrated, gratuity analyzing computing device 112 may further include other components such as, for example, a memory, a display, an input unit, and the like.

As described herein, gratuity analytics computing device 112 is in direct or indirect communication with POS device 510. In an exemplary embodiment, gratuity analytics computing device 112 receives a real-time POS data feed 520 from POS device 510. Gratuity analytics computing device 112 may also be in direct or indirect communication with payment processor 28. Gratuity analytics computing device 112 receives historical transaction data 540 (e.g., customer satisfaction score and/or merchant benchmark data) from payment processor 28. In some embodiments, gratuity analytics computing device 112 may be in communication with both POS device 510 and payment processor 28, either directly or indirectly. Gratuity analytics computing device 112 may communicate with the payment processor 28 and/or the POS device 510, for example, through an application and/or a web browser.

Receiver 580 may receive historical transaction data 540 and/or real-time POS data feed 520 for use in calculating and analyzing gratuity information of a plurality of cardholders who made purchases at a plurality of merchants in a plurality of locations. Merchants may include restaurants associated with the user and competitors of restaurants associated with the user. Alternatively, merchants may include a different type of business for which gratuities are commonly given, and for which gratuity information may be collected. In an embodiment, received code messaging may include individual customer information, such as an account number (or other identifying indicator) included within the code message, from which gratuity analytics computing device 112 may identify a gratuity size left by an individual at one or more of a plurality of merchants or service providers.

According to an exemplary embodiment, receiver 580 receives authorization data and clearing data for a plurality of transactions. The authorization data and the clearing data may be stored locally, or may be stored remotely, for example, in a data warehouse of payment processor 28. In some examples, receiver 580 may receive historical transaction data 540 and/or real-time POS data feed 520 in response to a query transmitted by transmitter 586 to a remote device such as the data warehouse. Historical transaction data 540 and/or real-time POS data feed 520 received by receiver 580 may include transactions that occur during a predetermined period of time, for example, over a week of time, a month of time, a year of time, and the like. In an exemplary embodiment, historical transaction data 540 includes customer identification information, geographical information, and merchant category information. Historical transaction data 540 and/or real-time POS data feed 520 may include one or more of a first bill amount (e.g., authorization amount), a second bill amount (e.g., clearing amount), an employee ID, a manager ID, a table ID (restaurant example), an automobile ID (taxi service example), a merchant ID, and a time stamp.

The receiver 580 may also receive input from various users via a client computing device 114. For example, the receiver 580 may receive an input from a user via the client computing device 114 such as a desktop computer, a mobile device, a personal digital assistant (PDA), a tablet, an MP3 player, a laptop computer, and the like. The input from the user may be received via a wired connection, a wireless connection, or a combination thereof. In response to receiving a user input such as date range and location 530, the receiver 580 may store the user input in a memory (not shown) of the gratuity analyzing computing device 112. Furthermore, the user input may be used to control the analyzer 584 as is further explained herein.

Based on the received transaction data, the calculator 582 may match authorization transactions to clearing transactions, for example, based on one or more transaction identifiers included within both the authorization transactions and the clearing transactions. Calculator 582 may determine a gratuity amount for a matched transaction based on a difference in a payment amount between a clearing transaction and an authorization transaction. For example, the calculator 582 may determine a gratuity amount for all matched transactions, and store the gratuity data locally or remotely along with the historical transaction data 540 and real-time POS data feed 520.

Gratuity analytics 550 may be provided to a user via the client computing device 114, for example, based on an input of the user received by the receiver 580. For example, the receiver 580 may receive a request from the client computing device 114 for merchants within a specific location. In response, analyzer 584 may analyze the gratuity amounts generated by calculator 582 and generate tip data about merchants corresponding to the transactions who are within the specific location requested by the user. In an exemplary embodiment, gratuity analytics 550 includes a normalized customer satisfaction score (see FIG. 9, below) and benchmark merchant average and/or aggregated gratuity data.

In an exemplary operation, analyzer 584 determines historical gratuity information for one particular customer purchasing services from a plurality of merchants within the same category, subcategory, and geolocation (e.g., three pizza restaurants within the same zip code). In this example, the customer visits the three different pizza restaurants 5 times, 4 times, and 5 times, respectively within the same predetermined time period, and leaves an average respective gratuity of 12%, 11%, and 15% at the three restaurants. From this customer data, a customer satisfaction score, or "happiness index," can be generated. Specifically, the respective gratuity data may be collected, stored, and normalized to be converted into a numeric range utilizing the average gratuity data and the number of visits.

In the example described above, the customer satisfaction score for the first of the three restaurants (average gratuity of 12%), for this particular customer, and in relation to the other two restaurants, can be mathematically determined by:

$$(12\%/((12\%*5)+(11\%*4)+(15\%*5))/14)\cdot 100=93.5\%$$

Accordingly, for this example, the customer satisfaction score for this particular customer the first of the three different pizza restaurants is 93.5%, where a score 100% represents this particular customer's average pizza chain satisfaction level. In the exemplary embodiment, customer satisfaction score is represented by a percentage, where a score above 100% indicates increasing customer satisfaction, and a percentage below 100% indicates decrease in customer satisfaction. It should be noted that the percentage of the customer satisfaction score is not the same as the respective percentages of the gratuities used to calculate the score. In an alternative embodiment, the customer satisfaction score is normalized, such that any score above 1 indicates increasing satisfaction, and any score below 1 indicates decrease in satisfaction.

In an alternative embodiment, analyzer 584 optionally determines an average tip amount/percentage for a particular merchant, a group of merchants, a location, and the like, and may also determine whether the tip amount/percentage is currently trending upward or downward by comparing current tip data with previous tip data. Analyzer 584 may further consider this trending information in comparison with the customer satisfaction score for further visual display, or to calculate different weighted data for the customer satisfaction score, such as the relative size, age, or other factors that may influence an individual customer's satisfaction at a particular establishment or service.

Transmitter 586 may transmit the customer satisfaction score, as well as other desired gratuity analytics, to client computing device 114, for example, through a wired and/or wireless connection. In an exemplary embodiment, a user may logon to a web browser controlled by a payment processor 28, an issuing bank, and the like, and receive tip data by requesting tip data through the web browser. As another example, the user may have a mobile application stored on a mobile device of the user. The payment processor 28, issuing bank, and the like, may have an application stored on a computing device thereof that supports the mobile application stored on the mobile device of the user. Accordingly, the user may request tip data through the mobile application stored on the user's mobile device.

Processor 588 may control the overall operation of gratuity analyzing computing device 112. Also, in some examples, the operation of one or more of receiver 580, calculator 582, analyzer 584, and transmitter 586 may be performed or controlled by processor 588. In an exemplary embodiment, gratuity analytics computing device 112 may use real-time POS data feed 520 to determine, at analyzer 584, when a customer satisfaction score is outside of a predetermined threshold range (e.g., if a tip for a server at a pizza restaurant leads to a customer satisfaction score significantly above or below 100% average for that particular customer). In some embodiments, the threshold range is determined by analyzing the historical transaction data 540. Historical transaction data 540 may include past tip amounts and individual purchase sizes, which may significantly influence the gratuity for a particular transaction. That is, some very small purchases are known to receive relatively large tip percentages, whereas for many expensive purchases, gratuity percentages tend to more closely follow the standard for that business.

In an embodiment, gratuity analytics computing device 112 may transmit from the transmitter 586 an alert 560 to a manager device 570 associated with a manager ID. The alert 560 is transmitted as one or more of a short message service message, an e-mail, an application notification, or any other suitable form of communication. In this example, transmitted alert 560 indicates that the bill of an extremely dissatisfied customer or an extremely satisfied customer has been processed. This indication is based on the customer satisfaction score falling significantly outside a predetermined range. The alert 560 may be communicated to the manager device 570, and in the case of a restaurant, may include the employee ID and the table ID associated with the customer. Alert 560 may allow the manager to respond to the customer while the customer is still in the restaurant, thereby allowing the manager to discover the source of dissatisfaction or satisfaction, if desired.

Figure 6:
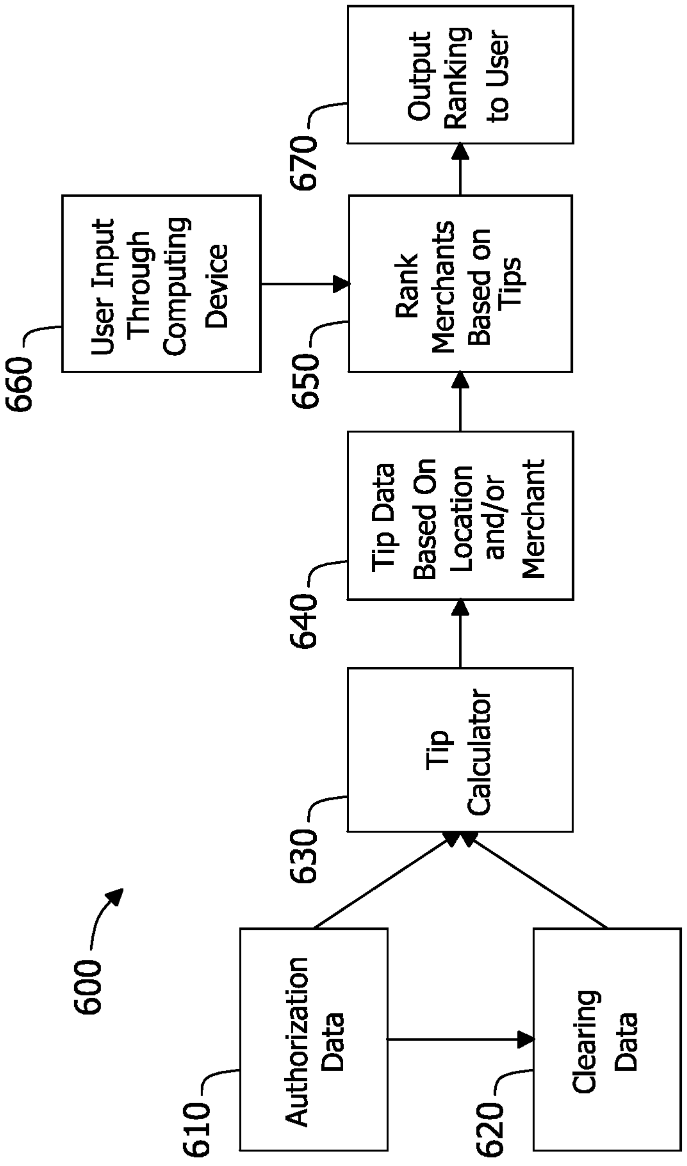

FIG. 6 is a data flow block diagram illustrating an example of a process 600 of calculating and analyzing gratuity analytics in accordance with an example embodiment of the present disclosure. Process 600 may analyze transaction data over a period of time, geography, and/or merchant category, and determine gratuity data 640 based on the transaction data over the period of time. For example, the transaction may be a purchase made using a payment card, for example, a credit card, a debit card, a prepaid card, a charge card, a membership card, a promotional card, a frequent flyer card, an identification card, a gift card, and/or any other device that may hold payment account information, such as a mobile phone, a fob, and the like. Also, the period of time may be any desired amount of time, for example, a week, a month, a year, two years, and the like. In addition, the period of time is not necessarily the most recent period of time but may be, for example, a period of time from a previous month, a previous year, a previous two years, and the like. Geography, for example, may include a defined radius or zone around a merchant primary place of business or a contractor's residence, a city, a county, a state, or a country. Merchant category may include, for example, and identifier to classify a particular business within a competitive field of similar businesses (e.g., fast food restaurant, fine dining restaurant, online or headquartered taxi service, hairstylist, etc.).

In this example, authorization data 610 is generated from the authorization process of approving or declining a transaction before a purchase is finalized or cash is disbursed. For example, the authorization data 610 may be based on a purchase of items such as goods and/or services from a merchant where a tip is customary to show satisfaction with the service provided. As a non-limiting example, the items may include a round of golf, a meal at a restaurant, a cab ride, a service provided by a moving company, a barber shop, a hair salon, a cleaning service, and the like. In this example, the authorization data 610 includes one or more transaction identifiers about the transaction which may include an account number or a card number, a time and date of the transaction, a location, a merchant identification, a merchant category code, and the like. The authorization data 610 may be generated in response to an employee of the merchant entering payment information such as the payment card or payment account information of a purchaser. The authorization data 610 may be stored in a database, for example, a data warehousing system of a payment processor.

Clearing data 620 is generated from the clearing process of exchanging transaction data between a payment processor and an issuing bank (i.e., issuer), as described above with respect to FIG. 1. From the information provided in clearing, a payment processor may calculate the amounts for settlement. Clearing includes sending transactions from the processor to the issuer for posting to the cardholder's account (also known as "presentment"). The payment processor gathers the information, edits it, assesses the appropriate fees, and sends it on to the appropriate receiver. The clearing messages contain data but do not actually exchange or transfer funds. Like the authorization data 610, the clearing data 620 also includes one or more transaction identifiers. Also, the clearing data 620 may be stored in a database such as the data warehousing system of the payment processor.

Based on the authorization data 610 and the clearing data 620, gratuity information may be calculated using a tip calculator 630. For example, a payment processor may query a database such as an authorization storage and a clearing storage of the data warehousing system to retrieve authorization data 610 and clearing data 620 relating to transactions carried out at one or more merchants at one or more locations in a given time period, for example during the past month, during a past year, during a previous month, during a previous year, and the like, and/or within a defined geography and merchant category.

The payment processor may match the transaction identifiers of the authorization data 610 to the transaction identifiers of the clearing data 620 to generate a table of matched identifiers. Based on the table of matched authorizations and clearings, the payment processor may determine gratuities paid by cardholders for the respective transactions, for example, based on a difference in payment amount between the clearing data 620 and the authorization data 610 of a corresponding transaction. The payment processor may determine gratuities for a number of transactions based on historical purchases for an individual user, as well as for purchases by a number of different users. The gratuity information may be stored by the payment processor.

In an exemplary embodiment, the payment processor determines gratuity analytics 640 for one or more customers with respect to a specific merchant or for a group of merchants of the same type within a similar location, as described above with respect to FIG. 5. For example, the payment processor may calculate the gratuities left by cardholders at a particular merchant over a particular amount of time, for example, a pizza restaurant over the past month. In this example, the payment processor may determine an average gratuity left by cardholders at the pizza restaurant over the last month and generate gratuity analytics 640. For example, the gratuity analytics 640 may include a tip percentage, a tip amount, number of visits to the restaurant by the customer within the month, a current tipping trend for the business, a current tipping trend for the geographical location, a current tipping trend for the merchant ID, a current tipping trend based on the card type, and the like. The current tipping trend may be calculated by comparing historical tipping data with current tipping data and determining a trend based on the comparison.

In an exemplary embodiment, as described above, the payment processor may group together similar types of merchants located in the same area, and determine average gratuity information for one or more of a plurality of cardholder customers for the group of merchants of the same type within the same area. At 650, merchants or groups of merchants are compared with each other and a ranking is provided at 670. In this example, the ranking 650 subprocess is determined based on one or more customers satisfaction scores the individual merchants, or an average customer satisfaction score for each merchant, and is provided 670 to user. Rankings 650 may be based on and/or in response to an input of a user 660. At 660 the user may determine whether to be provided with gratuity analytics of individual merchants or groups of merchants. For example, the user may input one or more locations, a merchant type, and or other information.

In an exemplary embodiment, at 650, individual merchants located in a similar location may be compared with each other and a ranking of the merchants based on customer satisfaction scores may be provided (as described above with respect to FIG. 5) at 670. This information may be helpful to someone looking for employment in a particular area. As another example, customer satisfaction scores of similar merchant types within the same geolocation may be grouped together, and customer satisfaction scores of groups of similar types of merchants from different locations may be compared with each other at 650 and provided to the user at 670. This information may be helpful to someone interested in opening a business of a same or similar type of business provided by the grouped merchants. As another example, customer satisfaction scores of similar merchant types may be helpful to the CFO, COO, and CMO to determine subjective performance of a particular business location, in addition to objective benchmark performance information.

As described above and herein, in some embodiments, the system and/or components thereof (e.g., a payment processor or gratuity analyzing computing device, FIG. 5) may store merchant identifiers and/or associated payment amounts, gratuity amounts, base price amounts, and total amounts, and/or cardholder/account identifiers, without including sensitive personal information, also known as personally identifiable information or PII, in order to ensure the privacy of individuals and/or merchants associated with the stored data. Personally identifiable information may include any information capable of identifying an individual. For privacy and security reasons, personally identifiable information may be withheld and only secondary identifiers may be used. For example, data received by the system and/or components thereof may identify user "John Smith" as user "ZYX123" without any method of determining the actual name of user "ZYX123". In some examples where privacy and security can otherwise be ensured (e.g., via encryption and storage security), or where individuals consent, personally identifiable information may be received and used by the system. In situations in which the systems discussed herein collect personal information about individuals and/or merchants, or may make use of such personal information, the individuals and/or merchants may be provided with an opportunity to control whether such information is collected or to control whether and/or how such information is used. In addition, certain data may be processed in one or more ways before it is stored or used, so that personally identifiable information is removed. For example, an individual's identity may be processed so that no personally identifiable information can be determined for the individual, or an individual's geographic location may be generalized where location data is obtained (such as to a city, ZIP code, or state level), so that a particular location of an individual cannot be determined.

In an exemplary embodiment, a customer satisfaction score is calculated for an individual merchant. In an alternative embodiment, certain information about a particular merchant may be generalized or aggregated to information about an associated merchant type, to obscure merchant-level data, where the customer satisfaction score may be instead to evaluate an aggregate of businesses within a particular geography, or a comparison of customer satisfaction scores between different merchant categories.

Figure 7:
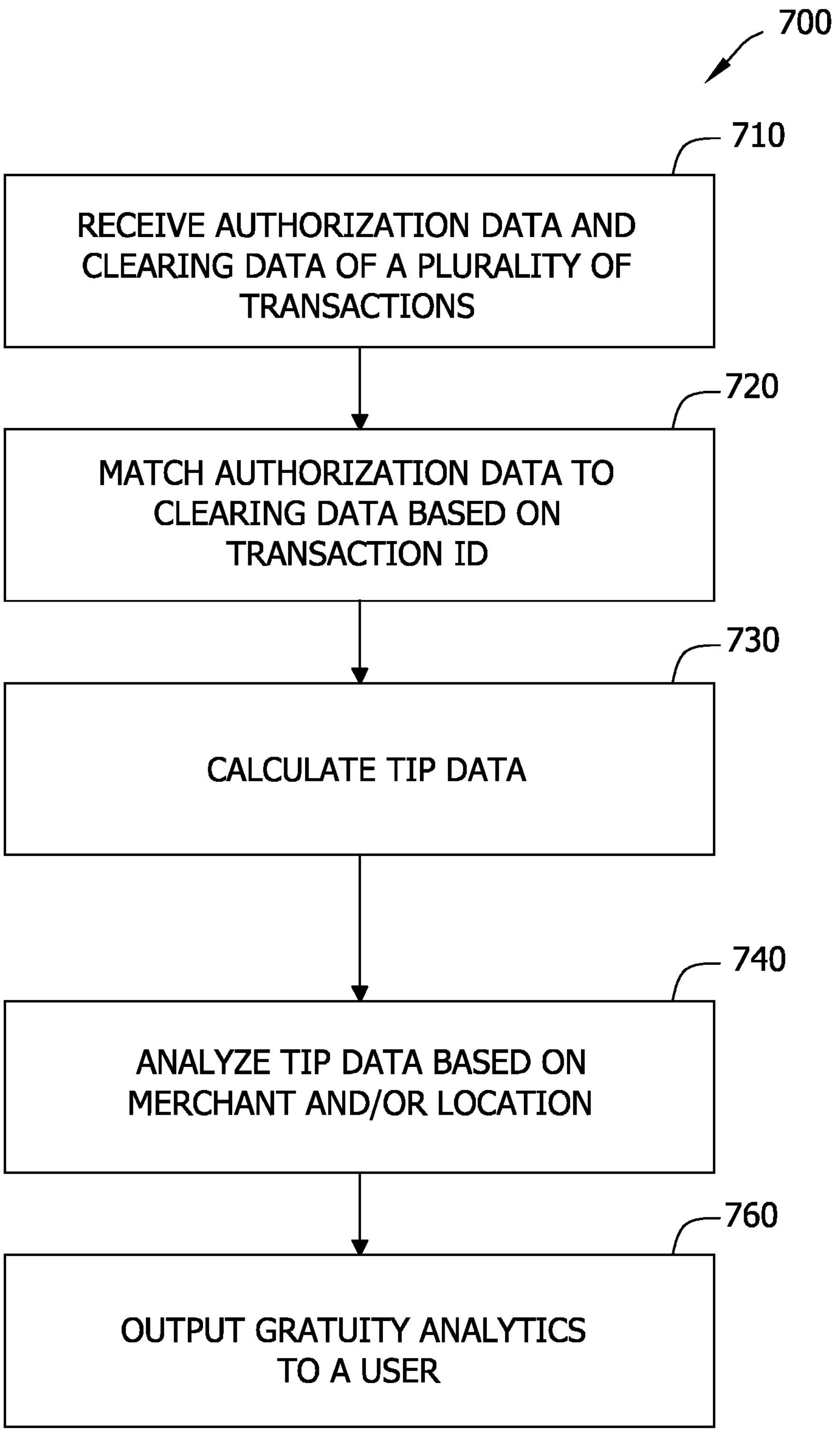

FIG. 7 is a diagram illustrating an example of a gratuity analyzing method 700 in accordance with an example embodiment of the present disclosure. Method 700 may be performed by a computing device associated with or corresponding to a payment processor. In this example, authorization data and clearing data of a plurality of transactions may be received, in 710. For example, the authorization data and the clearing data may be received automatically based on a predetermined timer, at various intervals. As another example, the authorization data and the clearing data may be received in response to a request or a query for the authorization data and the clearing data that is received from the computing device. For example, the authorization data and the clearing data may be transaction data generated during a time period that may be identified by the query transmitted by the computing device. As a non-limiting example, the time period may be the previous week, the previous month, the previous year, and the like. Also, to determine trending information, the period of time information may include a period of time that is in the past, for example, a period of time from a year ago, and the like.

Based on the authorization data and the clearing data, in 720 authorization data from a respective transaction may be matched to transaction data from the same transaction. For example, a table may be generated in which transaction identifiers included in authorization data from a plurality of transactions is respectively matched with transaction identifiers included in clearing data from the plurality of transactions. In this example, the computing device may determine that an authorization message matches a clearing message based on one or more transaction identifiers common to both the authorization message and the clearing message.

According to various examples, in 730, the method 700 may further include calculating a customer satisfaction score for one or more of the plurality of transactions. Based on the matched transaction data, the payment processor may determine gratuities paid by cardholders for the respective transactions, for example, based on a difference in payment amount between a total payment amount of the clearing data and a total payment amount of the authorization data of a corresponding transaction. The payment processor may determine gratuities for a plurality of transactions based on purchases by a plurality of different users. Also, the gratuity information may be stored by the payment processor.

In 740 the calculated customer satisfaction score(s) may be analyzed and a plurality of merchants may be ranked against each other based on the calculated customer satisfaction score thereof. For example, in response to a user input for a particular location, customer satisfaction scores of a plurality of different merchants may be compared with each other, and a ranking from best to worst customer satisfaction scores may be generated and provided to the user. In an alternative embodiment, the customer satisfaction scores may be provided along with gratuity analytics including an average amount of tip, an average tip percentage, and/or an indication as to whether the tip percentage is trending up or down. As another example, tip data of a plurality of similar types of business in a particular location may be grouped together. For example, a type of merchant such as barbershops in the same neighborhood, zip code, city, county, and the like, may be analyzed and tip data from the barbershops may be aggregated to generate tip data for a type of business in a particular location.

As described above with respect to FIG. 5, calculation of customer satisfaction scores may be performed for similar types of businesses. Accordingly, customer satisfaction scores of a group of merchants of a first type of business may be compared with tip data of a different group of merchants of a second type of business located in the same geolocation. As another example, different locations may be compared with each other. For example, customer satisfaction scores from a group of merchants of a first type of business in a first geolocation may be aggregated or averaged. Also, customer satisfaction scores of a group of merchants of the first type of business, but located in a second geolocation, may also be aggregated or averaged. Accordingly, customer satisfaction scores of groups of businesses in different locations may be compared with each other. For example, an average customer satisfaction score of a group of hair salons located in Kansas City, MO may be compared with an average customer satisfaction score of a group of hair salons located in St. Louis, MO.

The compared and ranked customer satisfaction scores of the merchants from one or more locations may be output to a user, in 750. For example, the ranked customer satisfaction scores may be displayed through a web browser on a screen of a user computer. As another example, the ranked customer satisfaction scores may be transmitted to a mobile device of the user through a mobile application, and the ranked customer satisfaction scores may be displayed on a screen of the mobile device.

Figure 8:
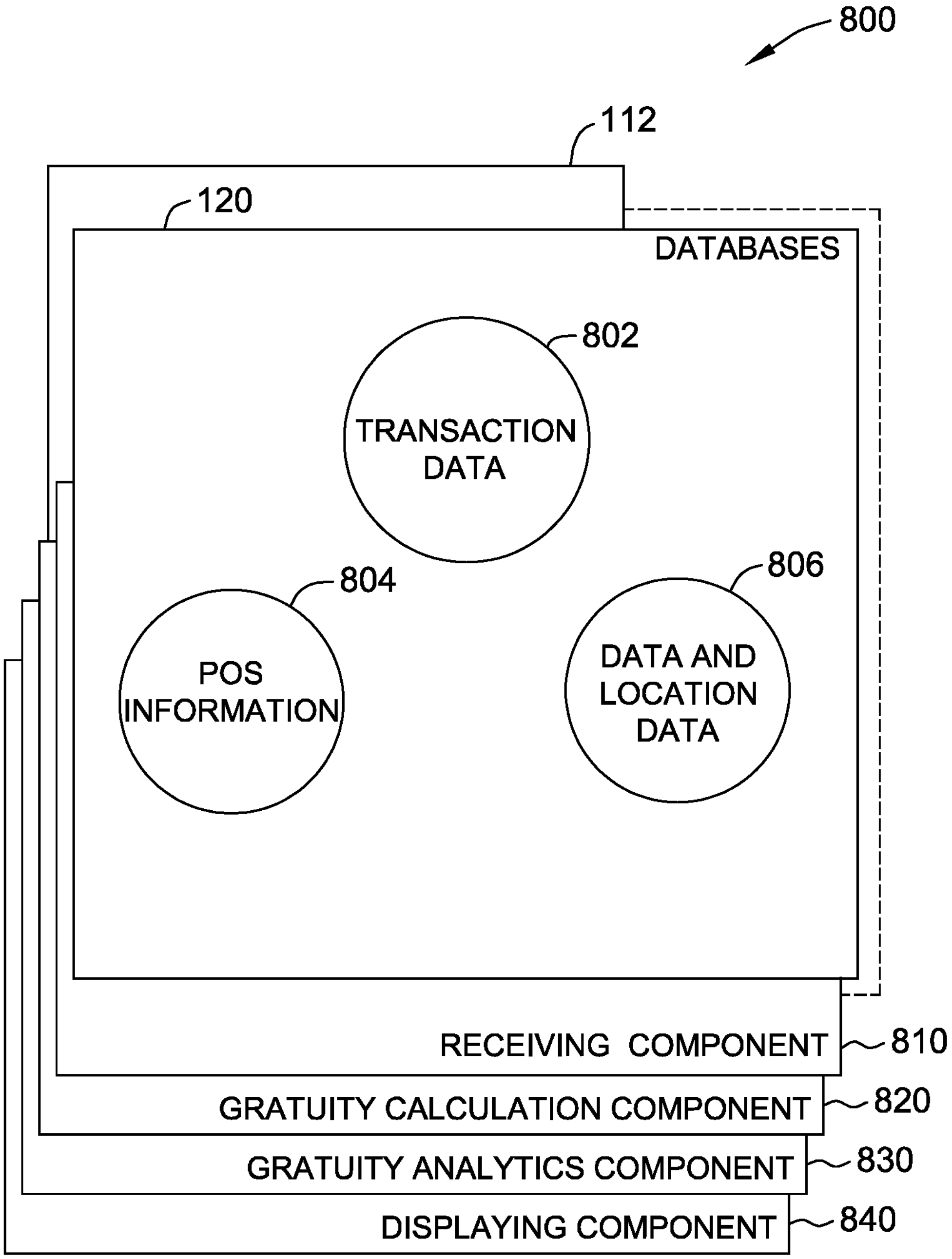

FIG. 8 is a diagram of components of one or more example computing devices that may be used in the environment shown in FIG. 2. FIG. 8 further shows a configuration of databases including at least database 120 (shown in FIG. 2). Database 120 may store information such as, for example, transaction data 802, POS information 804, and data and location data 806. Database 120 is coupled to several separate components within gratuity analytics computing device 112, which perform specific tasks.

Gratuity analytics computing device 112 includes a receiving component 810, a gratuity calculation component 820, a gratuity analytics component 830, and a display component 840. The receiving component 810 for receives transaction data 802 for financial transactions. The financial transactions may occur in real time or within a period of time. The transaction data 802 is associated with a plurality of merchants. The gratuity calculation component 820 is configured to use the transaction data 802, the POS information 804, and/or the data and location data 806 for calculating tip data and customer satisfaction scores. The gratuity analytics component 830 is configured to analyze the tip data and compare the customer satisfaction score(s). The displaying component 840 (alternatively referred to as a "display component") displays on a user interface the desired gratuity analytics.

In some implementations, gratuity calculation component 820 (or any other component of gratuity analytics computing device 112) may be further configured to calculate a trend in customer satisfaction score of a particular business or a group of businesses using received transaction data 802. The businesses may, for example, be a same chain of restaurants, restaurants of a particular type, or restaurants within a defined geolocation. In some implementations, gratuity calculation component 820 (or any other component of gratuity analytics computing device 112) may be further configured to consider is a factor to weigh an individual customer satisfaction score, the relative growth of a business (or competitors) over time, as well as the stability of each business considered in the calculation, using received transaction data 802 for a subset of the plurality of merchants located in a predetermined geolocation area. In this example, "stability" is defined to represent the maintenance of average tip size for a particular customer at that establishment during the period of time (e.g., customer tipping levels may change over time due to factors unrelated to the individual merchant establishment). Gratuity analytics component 830 may be further configured to determine a relative ranking for each merchant by comparing the stability of each merchant of the plurality of merchants, and generate the stability score for each merchant based on the relative ranking.

In some implementations, gratuity calculation component 820 (or any other component of gratuity analytics computing device 112) may be further configured to calculate a size of each merchant using received transaction data 802 for a subset of the plurality of merchants. The size represents a total tip size in each merchant during the period of time. As described above, very inexpensive purchases (e.g., small chain restaurant meal, short taxi ride, etc.) can produce larger relative tip sizes, whereas very expensive purchases (e.g., large meal for multiple diners at a fancy restaurant) may produce tip sizes closer to standard. Even though calculations described above can consider merchants of similar size, location, and category to determine the customer satisfaction score, individual consumers may not frequent a very expensive restaurant, for example, as often as a small chain restaurant, thereby providing less data from which to calculate the customer satisfaction score. In such cases, a single purchase may have a greater impact on the individual customer score of a particular establishment or service. Additionally, many restaurants set a policy of automatically charging a flat percent (or similar) gratuity for dining parties over a predetermined number of individuals (e.g., 6 or more). Gratuity analytics component 830 may be further configured to determine a relative ranking for each merchant by comparing the size of each merchants of the plurality of merchant, and generate the size score for each merchant based on the relative ranking.

In some implementations, gratuity calculation component 820 (or any other component of gratuity analytics computing device 112) may be further configured to calculate a traffic score of each merchant using received transaction data 802 for a subset of the plurality of merchants. The traffic score represents a number of transactions initiated in each merchant during the period of time. Gratuity calculation component 820 may be further configured to determine a relative ranking for each merchant by comparing the traffic score of each merchant of the plurality of merchants, and generate the traffic score ranking for each merchant based on the relative ranking, and then weight the calculated customer satisfaction score for one or more individual merchants consideration of the traffic score is a factor.

In some implementations, gratuity calculation component 820 (or any other component of gratuity analytics computing device 112) may be further configured to calculate an average ticket size for each merchant using received transaction data 802 for a subset of the plurality of merchants. The average ticket size represents an average transaction amount in each merchant during the period of time, and the average ticket size may be calculated by dividing a total sales revenue for a merchant by a number of transactions initiated in the merchant during the period of time. As described above, frequent purchasers of inexpensive services tend to provide significantly more data than in frequent purchasers of expensive services. Gratuity calculation component 820 may thus be further configured to determine a relative ranking for each merchant by comparing the average ticket size of each merchant of the plurality of merchants, as well as the frequency of purchases made by a particular customer at merchant establishment, generate the ticket size score for each merchant based on the relative ranking, and consider the ticket size score is a factor in weighting customer satisfaction score for a particular merchant establishment.

In some implementations, gratuity calculation component 820 (or any other component of gratuity analytics computing device 112) may be further configured to calculate competitor gratuity analytics using received transaction data 802, POS information 804, and/or data and location data 806 for a subset of the plurality of merchants. The competitor gratuity analytics represents the customer satisfaction score collected for a business' competitor. Gratuity analytics component 830 may be further configured to determine a relative ranking for each merchant by comparing the competitor customer satisfaction scores of each competitor.

In some implementations, gratuity calculation component 820 (or any other component of gratuity analytics computing device 112) may be further configured to calculate employee gratuity analytics using received transaction data 802, POS information 804, and/or data and location data 806 for a subset of the plurality of merchants. The employee gratuity analytics represents the customer satisfaction score associated with an individual employee ID. Gratuity analytics component 830 may be further configured to determine a relative ranking for each employee by comparing the employee customer satisfaction scores of each of a plurality of employees/contractors of the service provider.

In some implementations, gratuity calculation component 820 (or any other component of gratuity analytics computing device 112) may be further configured to calculate interlocation gratuity analytics using received transaction data 802, POS information 804, and/or data and location data 806 for a subset of the plurality of merchants. The inter-location gratuity analytics represent the customer satisfaction scores calculated for a plurality of individual establishments, franchises, or independent contractors of a service provider or chain of businesses. Gratuity analytics component 830 may be further configured to determine a relative ranking for each establishment/franchise/contractor of the provider by comparing the each individually generated customer satisfaction score. For example, according to this embodiment, customer satisfaction scores for restaurants of the same restaurant chain may be compared among the different locations in Missouri, Texas, and Florida.

In some implementations, gratuity calculation component 820 may be configured to generate a merchant record for each merchant of the plurality of merchants. Receiving component 810 may be configured to receive an investment goal associated with the plurality of merchants. Gratuity analytics component 830 may be configured to sort the plurality of merchant records according to the investment goal and the gratuity analytics for each sector in which each merchant of the plurality of merchants is located. Causing or displaying display component 840 may be configured to present the sorted merchant records in an optimized merchant management portfolio.

FIG. 9 illustrates an exemplary gratuity analytics table 900, which may be generated by a gratuity analytics computing device (e.g., gratuity analytics computing device 112, FIG. 2), and displayed to a user (e.g., through displaying component 840, FIG. 8) in whole or in part, according to the embodiments described above. Gratuity analytics table 900 compares collected tip data (not shown) for each of a plurality of individual customers 902 ("Sam," "Watson," "Jack") for a plurality of different merchants 904 (A, B, C) over a specified period of time (e.g., one month, three years, etc.), and generates an average visit tip amount (not separately numbered) according to an absolute scale 906, and for each customer 902 with respect to each merchant 904. For example, "Sam" tips an average of 10% at Merchant A, and "Jack" tips an average of 24% at Merchant C. From this generated average visit tip amount, gratuity analytics table 900 may then further determine an average customer tip amount 908 for an individual customer 902 across all merchants 904, as well as an average merchant tip amount 910 for an individual merchant 904 across all customers 902.

As described above, tip information according to absolute scale 906 provides some objective benchmark information by which individual merchants 904 may be ranked. In this example, according to the objective benchmark information, Merchant A is ranked first in average merchant tip amounts 910. However, as described above with respect to FIG. 5, average customer tip amount 908 may be further utilized to calculate individual customer satisfaction scores (not separately numbered) for each individual customer 902 at each individual merchant 904 in order to generate additional useful, and in some cases unexpected, information.

In the exemplary embodiment illustrated in FIG. 9, the individual customer satisfaction scores are represented according to a normalized scale 912 instead of the percentage example described above with respect to FIG. 5. Additionally, for simplicity of explanation, gratuity analytics table 900 does not illustrate the number of visits each customer 902 makes for each merchant 904, but a person of ordinary skill in the art will understand, according to the written description and drawings herein, how such information can be further implemented within gratuity analytics table 900 without departing from the scope of the embodiments. For example, individual customer satisfaction scores may be weighted in consideration of such parameters as the relative quantity of visits to one merchant 904 over another within the time period, or by the frequency of such visits. In fact, the ability to consider visit frequency/quantity significantly increases the versatility of the present systems and methods over conventional analytic systems.

From the individual customer satisfaction scores on normalized scale 912, gratuity analytics table 900 may further determine an average merchant customer satisfaction score 914 for each individual merchant 904 across all customers 902. As illustrated, average merchant customer satisfaction score 914 also allows individual merchants 904 to be ranked. However, according to this subjective information, Merchant C is now ranked first in average customer satisfaction score, despite being based on the same objective tip information from which the objective average merchant tip amounts are generated. Utilization of the customer satisfaction score for merchant ranking this can be shown to produce unexpected, but often valuable, information to merchants, customers, and/or card payment networks utilizing the systems and methods described herein.

Beyond the unexpected advantages described immediately above, the embodiments described herein realize still further advantageous results that amount to significantly more than conventional financial data analytics systems and processes. By utilizing the customer satisfaction score, a merchant may more accurately determine whether a customer is simply a low- or high-tipper, or whether that customer is genuinely considering the received service to be outside the normal experience for that particular customer. For example, a customer who normally tips in the range of 5% may tip 9% for what the customer perceives to be a particularly good experience. According to the objective gratuity analytics measurements, the 9% tip would be considered below the standard range, and might be a cause for concern for the merchant, when in fact the customer is well satisfied. A similar problem arises, for example, when a customer who normally tips the range of 40% may tip only 25% for what that customer perceives to be a bad experience. In this example, the 25% tip may not be a cause of concern for the merchant, when in fact the customer is not satisfied.

Systems and methods according to the present embodiments provide further advantages over systems that request customer surveys to rate the performance of delivered services. Such surveys are often returned sporadically, and often only for particularly good or particularly bad experiences, and therefore do not consistently contain objective data, or large amounts thereof. Additionally, the surveys are often offered with customer incentives which sometimes be costly to the service provider, and be considered burdensome to the customer. Similarly, some online websites or subscriber services will provide subjective, customer-based rankings of individual merchants or service providers. However, such websites/subscriber services tend to have the consistency of customer surveys (i.e., reflective generally of more extreme cases), and may be unreliable due to the fact that unscrupulous competitors may pose as customers to give unflattering reviews of a particular service provider. Similarly, unscrupulous service providers may pose as customers to artificially inflate their ranking among competitors. According to the present embodiments though, consistent and reliable objective customer information is utilized to overcome these problems experienced according to conventional systems and methods.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method using a gratuity analytics computing system in communication with at least one point-of-sale (POS) device over an interchange network, the system including a gratuity analytics computing device including a processor and in communication with a payment processor over the interchange network, the payment processor configured to process transactions, the system further including a database including a memory in operable electronic communication with the gratuity analytics computing device, the method comprising:

generating gratuity analytics for a plurality of transactions over a date range by analyzing a plurality of past tip amounts and corresponding individual purchase sizes for a user, wherein the corresponding individual purchase size for each past tip amount corresponds to an initial transaction total;

receiving, over the interchange network from a POS device associated with a service provider, in response to initiation of a payment transaction at the POS device, transaction data associated with a current transaction of the user, the transaction data including the initial transaction total and a final transaction total;

calculating, in real-time with respect to initiation of the payment transaction, i) a current tip amount for the current transaction by determining a difference between the initial transaction total and the final transaction total, and ii) a corresponding individual purchase size for the current transaction corresponding to the initial transaction total;

determining a threshold range for tips provided by the user, the threshold range determined by analyzing at least one of the past tip amounts and the corresponding individual purchase sizes;

comparing, in real-time with respect to initiation of the payment transaction, the calculated current tip amount for the current transaction to the determined threshold range;

in response to determining that the calculated current tip amount is outside the determined threshold range, generating, in real-time with respect to initiation of the payment transaction, an alert based on the comparison; and transmitting, over an electronic network different from the interchange network and in real-time with respect to initiation of the payment transaction, the alert to an electronic device associated with the service provider, the alert being in a suitable format to notify a representative of the service provider of the user is satisfied or dissatisfied while the user is at the service provider, and prompt the representative of the service provider to respond to the user while the user is at the service provider.

2. The method of claim 1 further comprising receiving, from the payment processor over the interchange network, a plurality of transaction data for the plurality of transactions occurring within the date range, the plurality of transaction data including a plurality of authorization messages and a plurality of clearing messages for the plurality of transactions, each transaction of the plurality of transactions including a corresponding authorization message and a corresponding clearing message, each authorization message and each clearing message including a respective transaction identifier.

3. The method of claim 2 further comprising matching a set of the plurality of authorization messages to a respective set of the plurality of clearing messages by matching the respective transaction identifiers, each authorization message including a corresponding initial transaction total and each clearing message including a corresponding final transaction total.

4. The method of claim 2, wherein the plurality of transaction data includes historical transaction data, and wherein the transaction data associated with the current transaction includes a real-time point-of-sale data feed from the POS device of the service provider.

5. The method of claim 1 further comprising calculating the plurality of past tip amounts for the user, each of the plurality of past tip amounts comprising a difference between a corresponding initial transaction total and a corresponding final transaction total.

6. The method of claim 1 further comprising displaying, on a graphical user interface of the electronic device of the service provider, at least one of a user satisfaction score and other gratuity analytics.

7. The method of claim 1, wherein an average tip amount from the user is based on at least one transaction with the service provider and at least one transaction with a comparative business within a same merchant category as a merchant category of the service provider.

8. The method of claim 1, wherein the alert i) includes information associated with the current transaction and ii) indicates whether the user is satisfied or dissatisfied.

9. At least one non-transitory computer-readable storage medium having computer-executable instructions embodied thereon, wherein when executed by a gratuity analytics computing device having at least one processor and in communication with at least one memory device and a payment processor over an interchange network, the computer-executable instructions cause the at least one processor to:

generate gratuity analytics for a plurality of transactions over a date range by analyzing a plurality of past tip amounts and corresponding individual purchase sizes for a user, wherein the corresponding individual purchase size for past each tip amount corresponds to an initial transaction total;

receive, over the interchange network from a POS device associated with a service provider, in response to initiation of a payment transaction at the POS device, transaction data associated with a current transaction of the user, the transaction data including the initial transaction total and a final transaction total;

calculate, in real-time with respect to initiation of the payment transaction, i) a current tip amount for the current transaction by determining a difference between the initial transaction total and the final transaction total, and ii) a corresponding individual purchase size for the current transaction corresponding to the initial transaction total;

determine a threshold range for tips provided by the user, the threshold range determined by analyzing at least one of the past tip amounts and the corresponding individual purchase sizes;

compare, in real-time with respect to initiation of the payment transaction, the calculated current tip amount for the current transaction to the determined threshold range;

in response to determining that the calculated current tip amount is outside the determined threshold range, generate, in real-time with respect to initiation of the payment transaction, an alert based on the comparison; and transmit, over an electronic network different from the interchange network and in real-time with respect to initiation of the payment transaction, the alert to an electronic device associated with the service provider, the alert being in a suitable format to notify a representative of the service provider of the user is satisfied or dissatisfied while the user is at the service provider, and prompt the representative of the service provider to respond to the user while the user is at the service provider.

10. The at least one non-transitory computer-readable storage medium of claim 9, wherein the computer-executable instructions further cause the at least one processor to receive, from the payment processor over the interchange network, a plurality of transaction data for the plurality of transactions occurring within the date range, the plurality of transaction data including a plurality of authorization messages and a plurality of clearing messages for the plurality of transactions, each transaction of the plurality of transactions including a corresponding authorization message and a corresponding clearing message, each authorization message and each clearing message including a respective transaction identifier.

11. The at least one non-transitory computer-readable storage medium of claim 9, wherein the computer-executable instructions further cause the at least one processor to calculate the plurality of past tip amounts for the user, each of the plurality of past tip amounts comprising a difference between a corresponding initial transaction total and a corresponding final transaction total.

12. The at least one non-transitory computer-readable storage medium of claim 9, wherein the alert i) includes information associated with the current transaction and ii) indicates whether the user is satisfied or dissatisfied.

13. A gratuity analytics computing system in communication with at least one point-of-sale (POS) device over an interchange network, the system comprising:

a gratuity analytics computing device comprising a processor and in communication with a payment processor over the interchange network, the payment processor configured to process transactions; and a database including a memory in operable electronic communication with the gratuity analytics computing device, wherein the processor is configured to:

generate gratuity analytics for a plurality of transactions over a date range by analyzing a plurality of past tip amounts and corresponding individual purchase sizes for a user, wherein the corresponding individual purchase size for each past tip amount corresponds to an initial transaction total;

receive, over the interchange network from a POS device associated with a service provider, in response to initiation of a payment transaction at the POS device, transaction data associated with a current transaction of the user, the transaction data including the initial transaction total and a final transaction total;

calculate, in real-time with respect to initiation of the payment transaction, i) a current tip amount for the current transaction by determining a difference between the initial transaction total and the final transaction total, and ii) a corresponding individual purchase size for the current transaction corresponding to the initial transaction total;

determine a threshold range for tips provided by the user, the threshold range determined by analyzing at least one of the past tip amounts and the corresponding individual purchase sizes;

compare, in real-time with respect to initiation of the payment transaction, the calculated current tip amount for the current transaction to the determined threshold range;

in response to determining that the calculated current tip amount is outside the determined threshold range, generate, in real-time with respect to initiation of the payment transaction, an alert based on the comparison; and transmit, over an electronic network different from the interchange network and in real-time with respect to initiation of the payment transaction, the alert to an electronic device associated with the service provider, the alert being in a suitable format to notify a representative of the service provider of the user is satisfied or dissatisfied while the user is at the service provider, and prompt the representative of the service provider to respond to the user while the user is at the service provider.

14. The gratuity analytics computing system of claim 13, wherein the processor is further configured to receive, from the payment processor over the interchange network, a plurality of transaction data for the plurality of transactions occurring within the date range, the plurality of transaction data including a plurality of authorization messages and a plurality of clearing messages for the plurality of transactions, each transaction of the plurality of transactions including a corresponding authorization message and a corresponding clearing message, each authorization message and each clearing message including a respective transaction identifier.

15. The gratuity analytics computing system of claim 14, wherein the processor is further configured to match a set of the plurality of authorization messages to a respective set of the plurality of clearing messages by matching the respective transaction identifiers, each authorization message including a corresponding initial transaction total and each clearing message including a corresponding final transaction total.

16. The gratuity analytics computing device of claim 14, wherein the plurality of transaction data includes historical transaction data, and wherein the transaction data associated with the current transaction includes a real-time point-of-sale data feed from the POS device of the service provider.

17. The gratuity analytics computing system of claim 13, wherein the processor is further configured to calculate the plurality of past tip amounts for the user, each of the plurality of past tip amounts comprising a difference between a corresponding initial transaction total and a corresponding final transaction total.

18. The gratuity analytics computing system of claim 13, wherein the processor is further configured to display, on a graphical user interface of the electronic device of the service provider, at least one of a user satisfaction score and other gratuity analytics.

19. The gratuity analytics computing device of claim 13, wherein an average tip amount from the user is based on at least one transaction with the service provider and at least one transaction with a comparative business within a same merchant category as a merchant category of the service provider.

20. The gratuity analytics computing device of claim 13, wherein the alert i) includes information associated with the current transaction and ii) indicates whether the user is satisfied or dissatisfied.

* * * * *